(12) United States Patent
Plummer

(10) Patent No.: US 7,216,848 B2
(45) Date of Patent: May 15, 2007

(54) CONDUIT ATTACHMENT SYSTEM FOR A CABLE PULLER

(75) Inventor: Jeffrey J. Plummer, Rockford, IL (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 11/199,695

(22) Filed: Aug. 9, 2005

(65) Prior Publication Data
US 2007/0034845 A1    Feb. 15, 2007

(51) Int. Cl.
E21C 29/16    (2006.01)
(52) U.S. Cl. ............................. 254/134.3 FT
(58) Field of Classification Search ....... 254/134.3 FT, 254/134.3 R; 269/902, 268, 45, 43
See application file for complete search history.

(56) References Cited

U.S. PATENT DOCUMENTS

| 2,221,903 | A |   | 11/1940 | Abramson et al. |
| 2,601,407 | A |   | 6/1952  | Marshall |
| 2,699,601 | A |   | 1/1955  | Darnell |
| 2,951,672 | A |   | 9/1960  | Bott |
| 3,190,616 | A |   | 6/1965  | Oleson |
| 3,968,952 | A |   | 7/1976  | Newell |
| 4,070,011 | A | * | 1/1978  | Glesser ......................... 269/45 |
| 4,456,225 | A |   | 6/1984  | Lucas |
| 5,096,163 | A |   | 3/1992  | Swearingen |
| 5,193,826 | A | * | 3/1993  | Smith ........................ 269/902 |
| 6,134,798 | A | * | 10/2000 | Duncan et al. ............. 269/902 |
| 6,286,815 | B1 |  | 9/2001  | Ray |
| 6,682,050 | B1 |  | 1/2004  | Ray |
| 6,708,930 | B2 |  | 3/2004  | Heath |
| 6,769,669 | B2 |  | 8/2004  | Cook et al. |
| 2005/0051759 | A1 | | 3/2005 | Plummer |

* cited by examiner

Primary Examiner—Robert C. Watson
(74) Attorney, Agent, or Firm—Trexler, Bushnell, Giangiorgi, Blackstone & Marr, Ltd.

(57) ABSTRACT

An adaptor for a cable puller provides for attachment of the cable puller to various sized conduits. The adaptor provides a V-shaped groove in which the conduit rests. A T-shaped clamp secures the adaptor to the conduit. Gripping members are provided along the V-shaped groove. The gripping members include ribs which mesh with a thread on the outer surface of the conduit to provide a secure connection between the cable puller and the conduit.

18 Claims, 8 Drawing Sheets

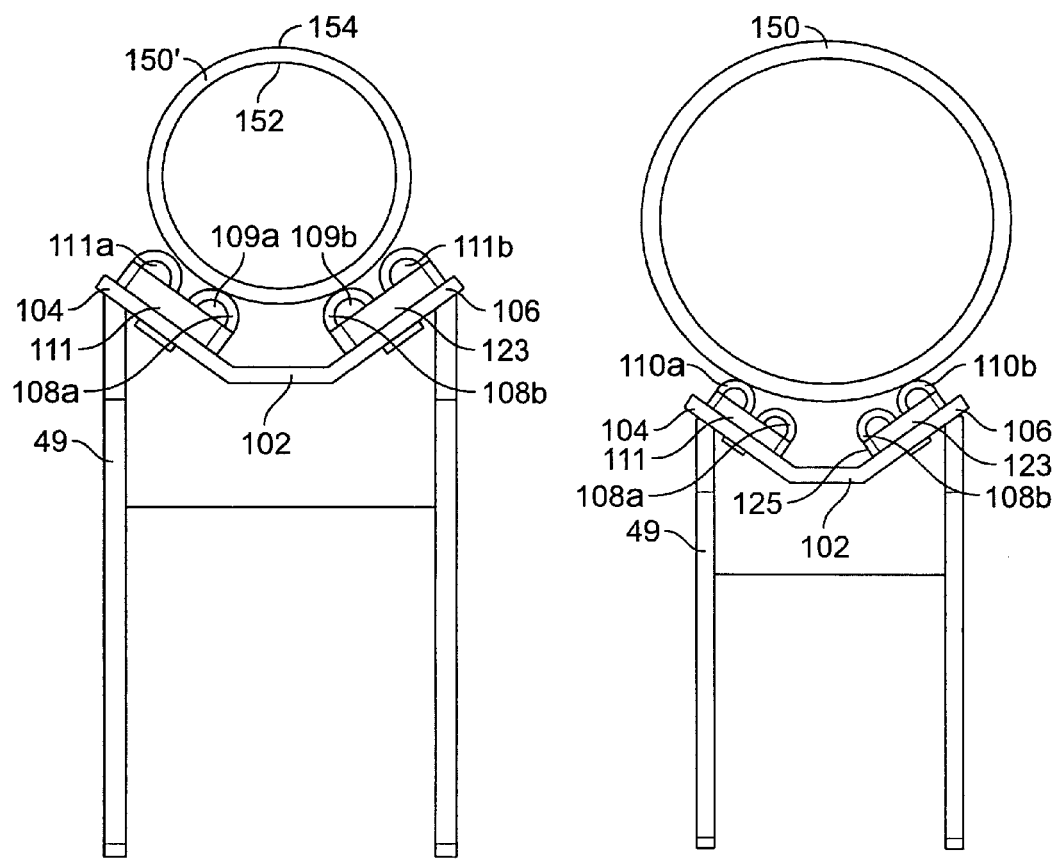
FIG. 9  FIG. 10

CONDUIT ATTACHMENT SYSTEM FOR A CABLE PULLER

BACKGROUND OF THE INVENTION

This invention is generally directed to an attachment system for a cable puller. Cable pullers are often used to pull cables or wires, for example, telephone wires, optical cables, or electrical service cables, through conduit. A typical cable puller generally includes a base and a boom extending from the base. An elbow is provided at the free end of the boom and an adaptor is mounted to the elbow. The adaptor generally includes brackets for attaching the adaptor to the elbow and a cylindrically-shaped extension for attaching the adaptor to the conduit through which the cable is pulled.

A first example of a prior art adaptor is shown in FIG. 1. The adaptor 20 includes a bracket 21 and a cylindrically-shaped extension 22 extending therefrom. The extension 22 is designed to fit within the end of the conduit through which the cable is to be pulled. The outer diameter of the cylindrically-shaped extension 22 is therefore slightly smaller than the inner diameter of the conduit to allow the extension 22 to nest within the conduit. A plurality of adaptors 20 having various diameters are provided so that the adaptor 20 can be sized to the conduit. Although an adaptor having an extension with a much smaller diameter could nest within the conduit, the adaptor would then restrict the opening through which the wire/cable was to be pulled.

A second example of a prior art adaptor is shown in FIG. 2. The adaptor 30 includes a bracket 31 and a cylindrically-shaped extension 32 having threads on the internal surface thereof. The adaptor 30 is mounted to a conduit by engaging the threads of the extension 32 with threads on the outer surface of the conduit. In order for the threads of the extension 32 to engage with the threads of the conduit, the adaptor 30 must be sized to the conduit. Thus, as with the adaptor 20 shown in FIG. 1, several adaptors 30 are needed to accommodate a variety of conduit diameters.

BRIEF SUMMARY OF THE INVENTION

The adaptor provides for attachment of the cable puller to various sized conduits. The adaptor provides a V-shaped groove in which the conduit rests. A T-shaped clamp secures the adaptor to the conduit. Gripping members are provided along the V-shaped groove. The gripping members include ribs which mesh with a thread on the outer surface of the conduit to provide a secure connection between the cable puller and the conduit.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 9 is a bottom plan view of a portion of the adaptor with a conduit having a relatively smaller diameter mounted thereto; and FIG. 10 is a bottom plan view of a portion of the adaptor with a conduit having a relatively large diameter mounted thereto.

Figure 1:
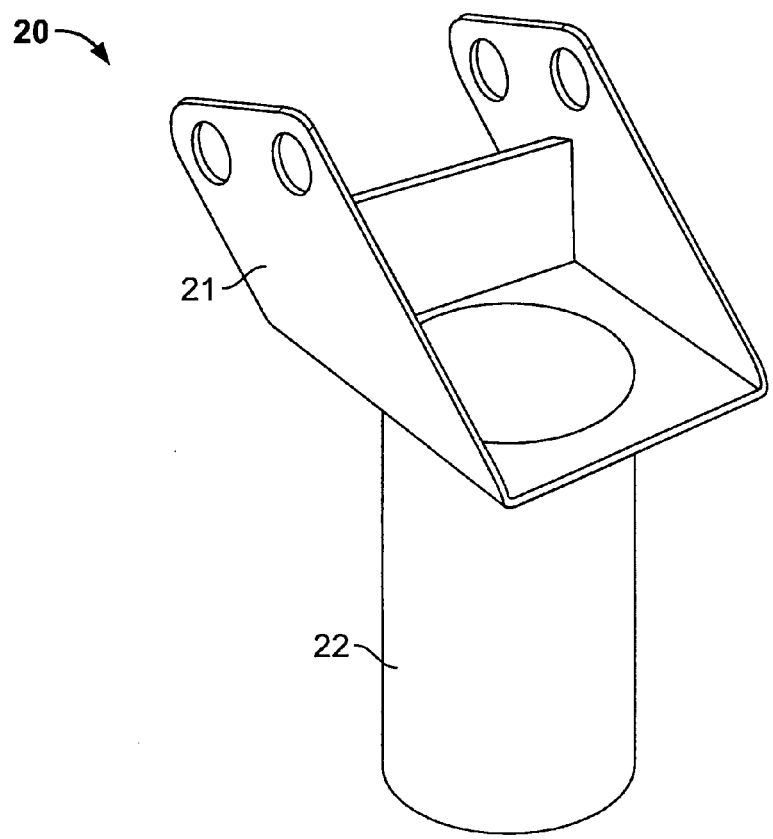
FIG. 1 is a perspective view of a prior art adaptor for use with a cable puller.
Figure 2:
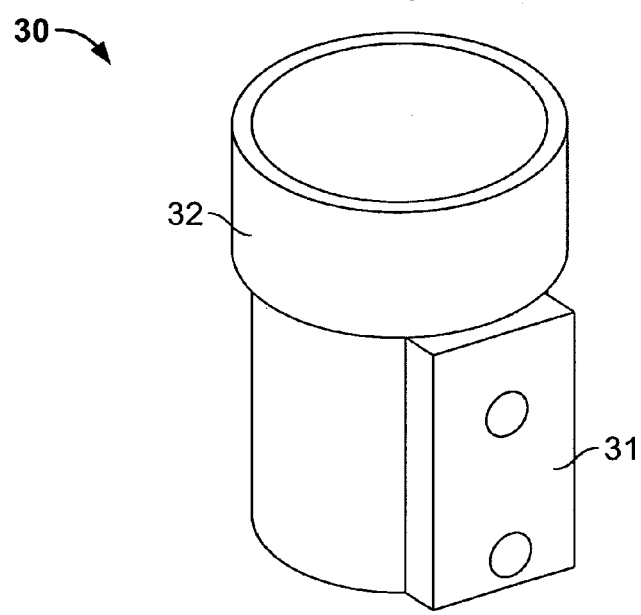
FIG. 2 is a perspective view of another prior art adaptor for use with a cable puller.

The present invention provides an adaptor for a cable puller which overcomes the problems presented in the prior art and which provides additional advantages over the prior art, such advantages will become clear upon a reading of the attached specification in combination with a study of the drawings.

DETAILED DESCRIPTION OF THE ILLUSTRATED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The adaptor 49 of the present invention along with a cable puller 40 is shown in FIGS. 3–10.

Figure 3:
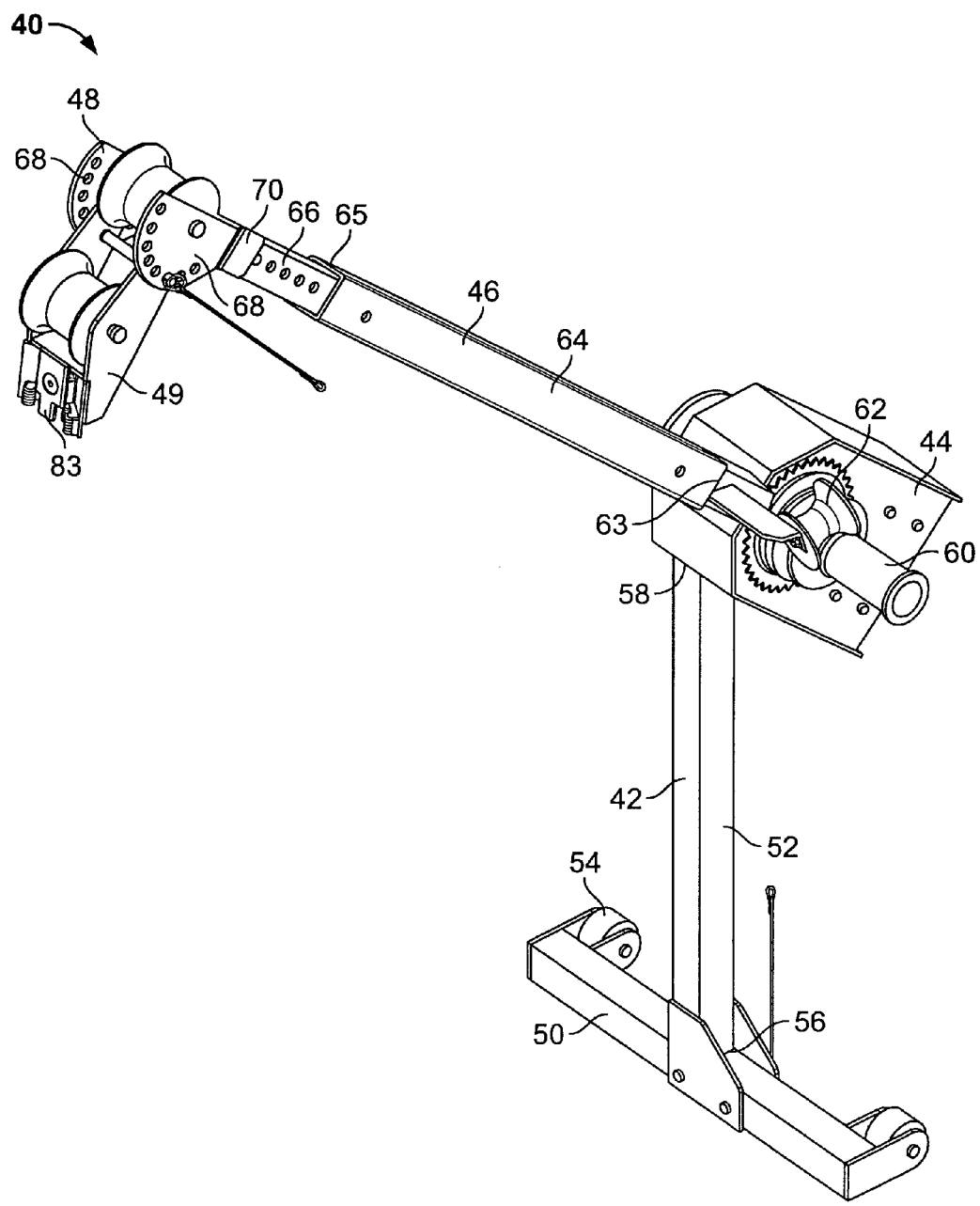
FIG. 3 is a perspective view of a cable puller with the adaptor of the present invention mounted thereto.

As best shown in FIG. 3, the cable puller 40 generally includes a base 42, a puller assembly 44, a telescoping boom 46 extending from the puller assembly 44, and an adjustable elbow 48. The adaptor 49 is mounted to the cable puller 40 at the elbow 48.

The base 42 generally includes a horizontal portion 50 which rests on the floor and a vertical portion 52 extending upwardly therefrom. Wheels 54 are provided proximate opposite ends of the horizontal portion 50 for transportation of the cable puller 40. The vertical portion 52 is elongated and includes a lower end 56 and an upper end 58. The lower end 56 is secured to a horizontal portion 50, proximate the center thereof. The upper end 58 is secured to the puller assembly 44.

The puller assembly 44 includes a capstan 60 about which the cable to be pulled is wound and a roller 62 for guiding the cable. The puller assembly 44 allows for adjustment of the angle between the base 42 and the boom 46.

The telescoping boom 46 includes an outer member 64 and an inner member 66. The outer member 64 has a first end 63 and a second end 65 and is formed from elongated side walls which form a square cross-section. Apertures are provided through opposite side walls of the outer member 64. The first end of the outer member 64 is secured to the puller assembly 44. The second end of the outer member 64 receives the inner member 66. The inner member 66 also has a first end and a second end and is also formed from elongated side walls which form a square cross-section. Apertures are provided through opposite side walls of the inner member 66. The perimeter of the inner member 66 is smaller than the perimeter of the outer member 64 to allow the inner member 66 to be positioned within the outer member 64. The inner member 66 is slidable relative to the outer member 64 to extend or reduce the effective length of the boom 46. Apertures through the inner member 66 are aligned with apertures of the outer member 64 and a pin (not shown) is passed through the aligned apertures to secure the relative positions of the inner and outer members 64, 66 of the boom 46. It is to be understood that the cross-section of the inner and outer members 64, 66 may be of a shape other than square.

Figure 4:
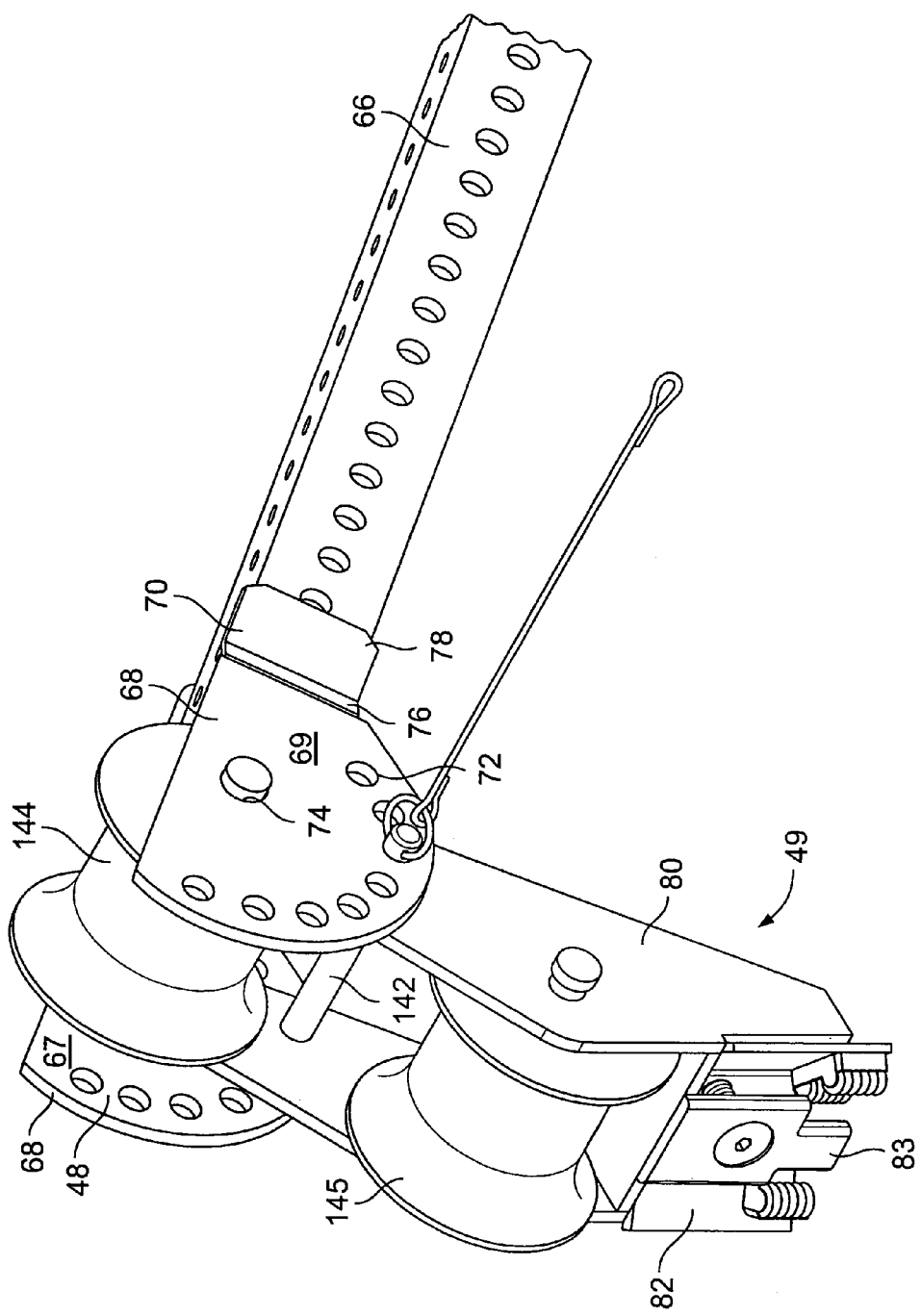
FIG. 4 is a perspective view of a portion of the cable puller and the adaptor of FIG. 3.

As best shown in FIG. 4, the adjustable elbow 48 includes two semi-circular plates 68, each having a brace 70 extending therefrom. The plates 68 are parallel and spaced from each other. Each plate 68 includes an inner surface 67 and an outer surface 69. A plurality of spaced apart adjustment apertures 72 are provided along the circumference of the plates 68 and a mounting aperture 74 is provided at the radial center of each plate 68. The brace 70 of each plate 68 includes a first portion 76 and a second portion 78. The first portions 76 are generally planar and rectangularly-shaped. The first portions 76 are angled inwardly relative to the plates 68. The second portions 78 are also generally planar and rectangularly-shaped. The second portions 78 extend from the respective first portions 76 and are generally parallel to the plates 68. The second portions 78 are spaced from each other such that the inner surfaces of the second portions 78 contact outer surfaces of the inner member 66 of the boom 46. The elbow 48 is secured to the inner member 66 of the boom 46 by conventional means.

The adaptor 49 generally includes a mounting member 80, an attachment member 82, a clamp 83, and a nut 85.

Figure 7:
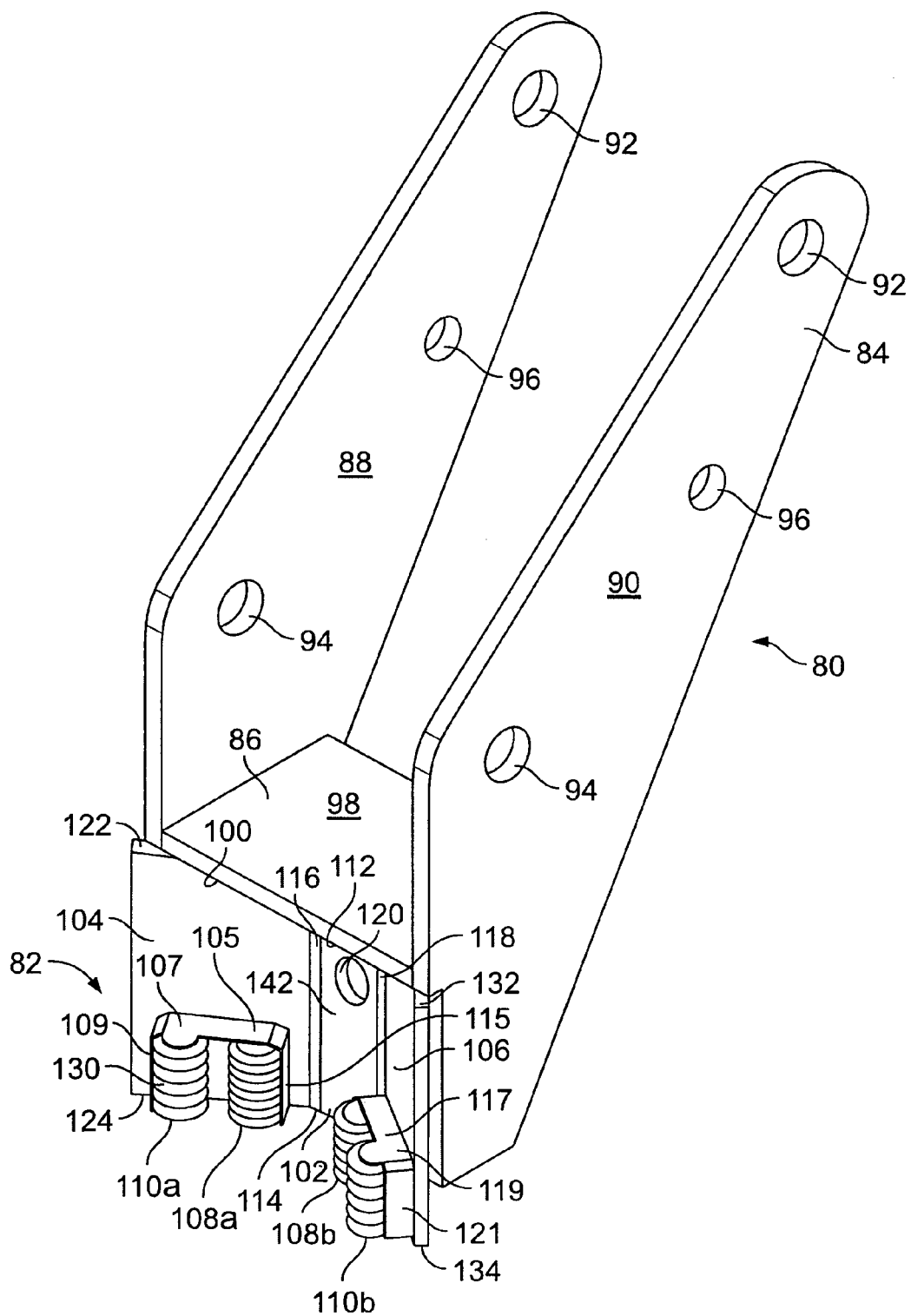
FIG. 7 is a perspective view of a portion of the adaptor.

As best shown in FIG. 7, the mounting member 80 generally includes two plates 84 and a brace 86. The plates 84 are generally triangularly-shaped and are positioned parallel to each other. Each plate 84 includes an inner surface 88 and an outer surface 90. Each plate 84 also includes a mounting aperture 92 proximate a first corner of the plate, a roller mounting aperture 94 proximate a second corner of the plate, and an adjustment aperture 96 spaced between the mounting aperture 92 and the roller mounting aperture 94. The plates 84 are aligned with one another such that the mounting apertures 92 are aligned to provide a pair of mounting apertures 92, the roller mounting apertures 94 are aligned to provide a pair of roller mounting apertures 94, and the adjustment apertures 96 are aligned to provide a pair of adjustment apertures 96.

The brace 86 is generally rectangularly-shaped and extends between the inner surfaces 88 of the plates 84 and is generally perpendicular thereto. The brace 86 includes an upper surface 98 and a lower surface 100. The brace 86 is preferably secured to the plates 84 by welding.

The attachment member 82 generally includes a base member 102, first and second flanges 104, 106, a pair of inner gripping members 108a, 108b and a pair of outer gripping members 110a, 110b.

The base member 102, first flange 104 and second flange 106 are preferably integrally formed. A generally V-shaped groove 142 is formed by the base 102 and the gripping members 108a, 108b, 110a, 110b.

The base member 102 is generally rectangularly-shaped and includes an upper end 112, a lower end 114, a first edge 116 and a second edge 118. The base member 102 extends from the lower surface 100 of the brace 86 and is generally perpendicular thereto. The upper end 112 of the base 102 is secured to the brace 86 preferably by welding. A post aperture 120 extends through the base 102 proximate the upper end 112 thereof.

The first flange 104 extends outwardly from the first edge 116 of the base member 102 and is angled relative thereto. The first flange 104 includes an upper end 122 secured to the brace 86 and a lower free end 124. One of the pair of outer gripping members 110a is mounted proximate the lower end of the flange 104 and one of the pair of inner gripping members 108a is mounted proximate the lower end 124 of the flange 104 and is spaced inwardly from the outer gripping member 110a toward the base 102. Each gripping member 110a, 108a is generally cylindrically-shaped and includes a plurality of radially extending ribs 130 along the length of the gripping member 110a, 108a. A rectangularly-shaped collar 105 extends outwardly from the flange 104. The collar 105 extends around the inner gripping member 108a and the outer gripping member 110a. An upper surface 107 of the collar 105 is proximate upper ends of the gripping members 110a, 108a; an outer surface 109 of the collar 105 is proximate the outer gripping member 110a; a lower portion 111 (see FIGS. 9 and 10) of the collar 105 is proximate the lower ends of the inner and outer gripping members 110a, 108a; and an inner surface 115 is proximate the inner gripping member 108a.

The second flange 106 extends outwardly from the first edge 118 of the base member 102 and is angled relative thereto. The second flange 106 includes an upper end 132 secured to the brace 100 and a lower free end 134. One of the pair of gripping members 110b is mounted proximate the lower end 134 of the flange 106 and a one of the pair of inner gripping members 108b is mounted proximate the lower end 134 of the flange 106 and spaced inwardly from the outer gripping member 110b toward the base 102. Each gripping member 110b, 108b is generally cylindrically-shaped and includes a plurality of outwardly extending ribs 130 along the length of the gripping member 110b, 108b. A rectangularly-shaped collar 117 extends outwardly from flange 106. The collar 117 extends around second inner gripping member 108b and second outer gripping member 110b. An upper surface 119 of the collar 117 is proximate upper ends of the gripping members 110b, 108b; an outer surface 121 of the collar 117 is proximate the outer gripping member 110b; a lower surface 123 of the collar 107 (see FIGS. 9 and 10) is proximate the lower ends of gripping members 110b, 108b; and an inner surface 125 is proximate the inner gripping member 108b.

The ribs 130 on the inner pair of gripping members 108a, 108b are preferably spaced such that 11½ ribs 130 are provided per inch (11½ tpi). The ribs 130 of the outer gripping members 110a, 110b are preferably spaced such that 8 threads/ribs are provided per inch (8 tpi).

Figure 5:
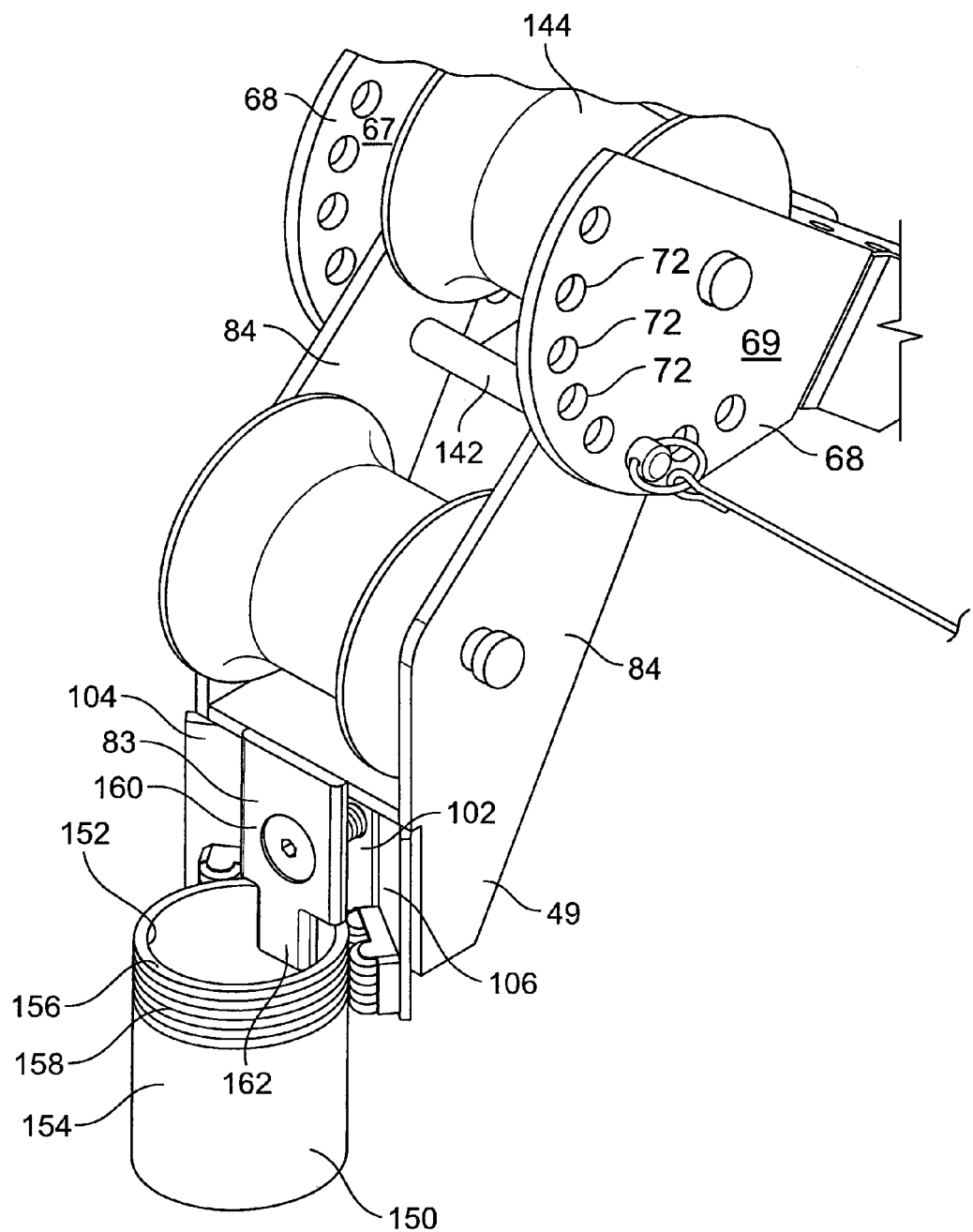
FIG. 5 is a detailed perspective view of the adaptor of the present invention and a portion of the cable puller on which the adaptor is mounted.
Figure 8:
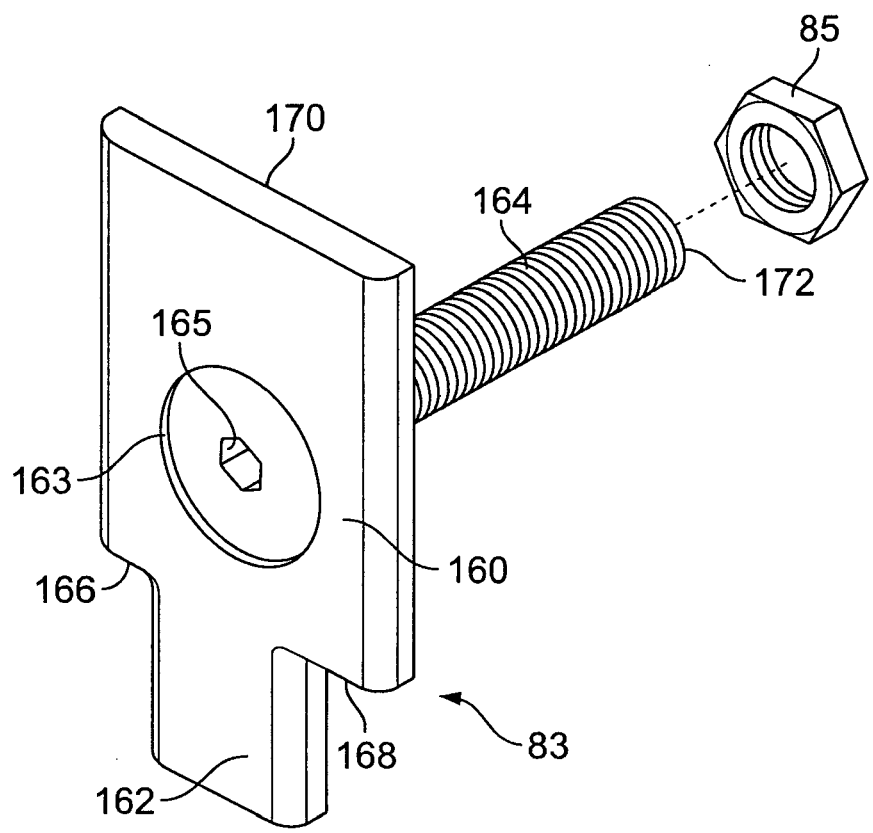
FIG. 8 is a perspective view of a portion of the adaptor.

As best shown in FIG. 5, the mounting member 80 is mounted to the elbow 48 of the cable puller 40 by placing the outer surfaces 90 of the triangularly-shaped plates 84 proximate the inner surfaces 67 of the plates 68 of the elbow 48. Next, the mounting apertures 92 of the plates 84 are aligned with the mounting apertures 74 of the plates 68 of the elbow 48 and ends of a roller 144 are mounted through the mounting apertures 74, 92 to secure the mounting member 80 to the elbow 48. The roller 144 provides an axis about which the mounting member 80 can be rotated to adjust the angle of the mounting member 80 relative to the elbow 48. The relative positions of the mounting member 80 and the elbow 48 are secured by passing a pin 142 through the adjustment apertures 72 of the plates 68 of the elbow 48 and through the adjustment apertures 96 through the plates 84 of the mounting member 80. A roller 145 is mounted in the roller mounting apertures 94 of the mounting member 80. As best shown in FIG. 8, the clamp 83 generally includes an upper portion 160, a lower portion 162, and a post 164. The upper portion 160 and the lower portion 162 are generally planar and rectangularly-shaped and generally form a T-shape. The lower portion 162 extends from the center of a lower edge of the upper portion 160. The lower portion 162 is narrower than the upper portion 162 such that abutments 166, 168 are provided by the upper portion 160. An aperture 163 is provided through the upper portion 160 of the clamp 83. The post 164 is provided within the aperture 163 such that a head of the post 164 is retained within the aperture and a body of the post 164 extends perpendicularly from a rear surface 170 of the upper portion 160. A free end 172 is provided by the body of post 164. A recess 165 is provided in the head of the post 164. A thread is provided along the outer surface of the body of the post 164.

Figure 6:
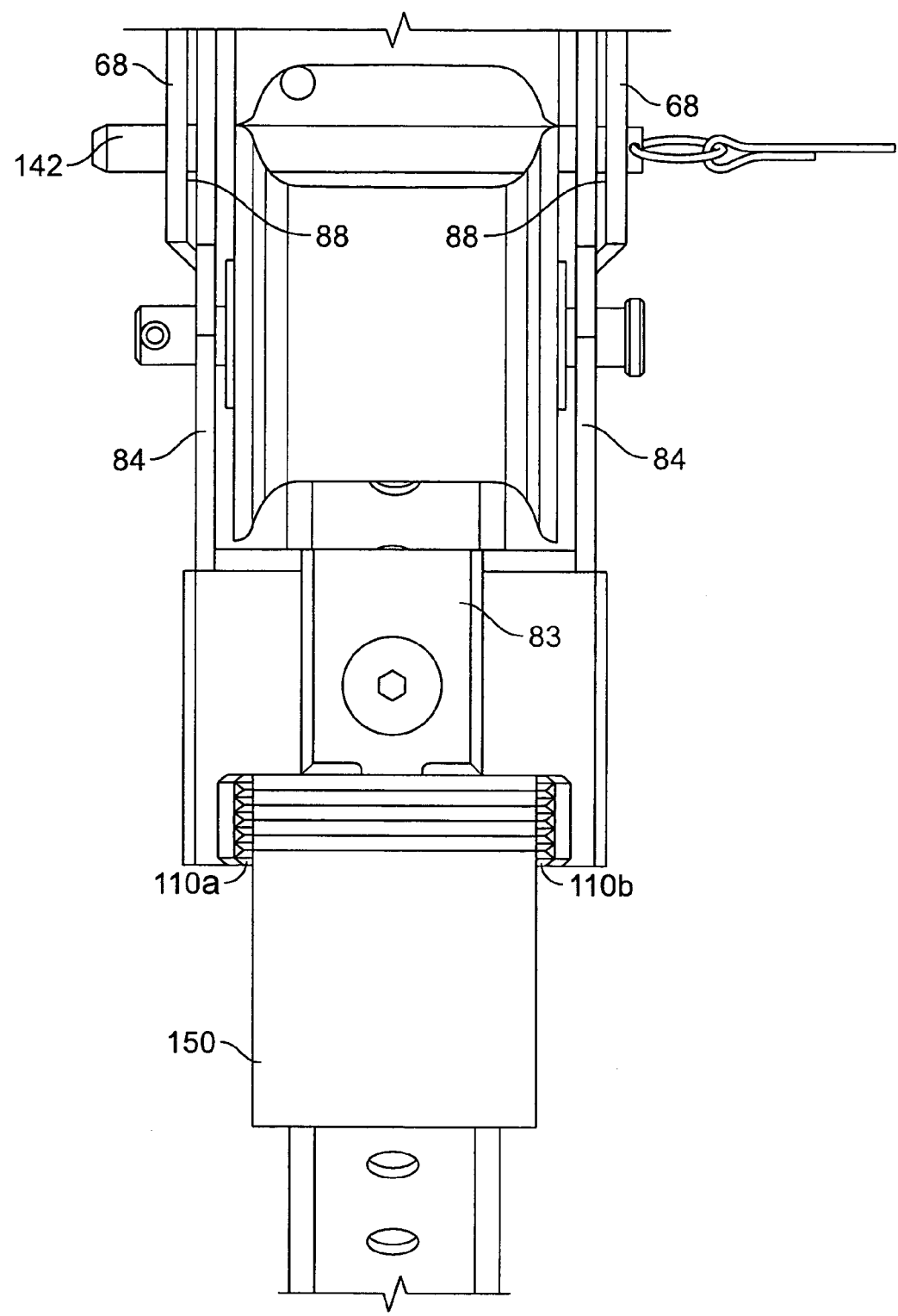
FIG. 6 is a front elevational view of the adaptor of FIG. 5 and a portion of the cable puller on which the adaptor is mounted.

A stationary conduit 150 mounted in a wall (not shown) to which the adaptor 49 is secured and through which a cable is to be pulled is shown in FIGS. 5, 6 and 10. As best shown in FIG. 5, the conduit 150 is generally cylindrically-shaped and includes an inner surface 152, an outer surface 154, and an end surface 156. A plurality of threads 158 are provided on the outer surface 154 of the conduit 150. The adaptor 49 is attached to the conduit 150 by placing the conduit 150 in the V-shaped groove 142 formed by the attachment member 82. The post 164 of the clamp 83 is passed through the post aperture 120 of the base member 102 and a nut 85 is threaded to the free end 172 of the post 164. The clamp 83 is positioned such that the second portion 162 of the clamp 83 extends into the conduit 150 and the abutment surfaces 166, 168 of the clamp 83 abut an end surface 156 of the conduit 150. The nut 85 is then rotated to draw the clamp 83 closer to the base member 102 thereby gripping the conduit 150 between the clamp 83 and the attachment member 82. A conduit 150' having a relatively smaller diameter is shown in FIG. 9.

As best shown in FIG. 9, when the adaptor 49 is mounted to a conduit 150' having a smaller diameter, for example a diameter of two inches or less, the conduit 150' rests against the inner gripping members 108a, 108b and the threads 158 of the conduit 150' nest within the threads 130 of the gripping member 108a, 108b. As shown in FIG. 10, when the adaptor 49 is mounted to a conduit 150 having a larger diameter, for example, a diameter of greater than two inches, the conduit 150 rests against the outer gripping members 110a, 110b and the threads 158 of the conduit 150' nest within the threads 130 of the gripping members 110a, 110b.

As shown in the drawings, the adaptor 49 is attached to a free standing conduit 150, 150' however, in some instances, a conduit nut (not shown) is threaded to the end of the conduit 150, 150' and is spaced from the end surface 156 of the conduit 150, 150'. In these instances, the lower surfaces 109a, 109b, 111a, 111b of the gripping members 108a, 108b, 110a, 110b may abut the conduit nut.

In addition to providing attachment between the cable puller 40 and the conduit 150, 150', the adaptor 49 provides a mechanism for transferring forces from the puller 40 to the conduit 150, 150' as the cable is pulled through the conduit 150, 150'. As cable is pulled through the conduit 150, 150', forces from the puller 40 are transferred from the puller 40, to the clamp 83 and to the conduit 150, 150' by way of the abutting edges 168 of the clamp 83, or in the event a conduit nut is provided, by way of the lower surfaces 109a, 109b, 111a, 111b of the gripping members 108a, 108b, 110a, 110b.

Thus, it can be seen that the adaptor 49 can accommodate conduits 150 of varying diameter. Because varying sized conduits 150 can be accommodated by the adaptor 49, the user does not need to have a plurality of adaptors 49 to accommodate different sized conduits 150. In addition, the puller 40 can be mounted to various conduits without requiring the adaptor 49 to be removed and a new adaptor mounted. Therefore, setup time is reduced.

While a preferred embodiment of the present invention is shown and described, it is envisioned that those skilled in the art may devise various modifications of the present invention without departing from the spirit and scope of the appended claims.

The invention claimed is:

1. An adaptor for attachment to a cable puller for securing the cable puller to a conduit, the adaptor comprising:
   a mounting member for securement to the cable puller;
   an attachment member secured to said mounting member, said attachment member including a pair of spaced apart gripping members;
   a clamp attached to said attachment member, said clamp includes a first portion and a second portion and said first portion is wider than said second portion, the position of said clamp being moveable relative to said attachment member, said clamp being capable of being locked into place relative to said attachment member; and
   wherein in use an outer surface of the conduit is placed against said gripping members and said clamp is secured to said attachment member so as to secure said adaptor to the conduit, said second portion contacting an inner surface of the conduit.

2. The adaptor of claim 1, wherein said first portion includes abutment edges extending outwardly from the second portion and an end surface of the conduit abuts said abutment edges.

3. An adaptor for attachment to a cable puller for securing the cable puller to a conduit, the adaptor comprising:
   a mounting member for securement to the cable puller;
   an attachment member secured to said mounting member, said attachment member including a pair of spaced apart gripping members, said gripping members form a pair of outer gripping members and further including a pair of inner gripping members between said pair of outer gripping members;
   a clamp attached to said attachment member, the position of said clamp being moveable relative to said attachment member, said clamp being capable of being locked into place relative to said attachment member; and
   wherein in use an outer surface of the conduit is placed against said gripping members and said clamp is secured to said attachment member so as to secure said adaptor to the conduit, said clamp contacting an inner surface of the conduit.

4. The adaptor of claim 3, wherein the inner pair of gripping members includes a plurality of ribs and the outer pair of gripping members includes a plurality of ribs and wherein the pitch of the ribs of the inner pair of gripping members is greater than the pitch of the ribs of the outer pair of gripping members.

5. An adaptor for attachment to a cable puller for securing the cable puller to a conduit, the adaptor comprising:
   a mounting member for securement to the cable puller;
   an attachment member secured to said mounting member, said attachment member including a base member and first and second flanges extending outwardly from said base member to form a V-shaped groove, and a pair of spaced apart gripping members, one of said gripping members of said pair of gripping members is provided on said first flange and the other of said gripping members of said pair of gripping members is provided on said second flange;

a clamp attached to said attachment member, the position of said clamp being moveable relative to said attachment member, said clamp being capable of being locked into place relative to said attachment member; and wherein in use an outer surface of the conduit is placed against said gripping members and said clamp is secured to said attachment member so as to secure said adaptor to the conduit.

6. The adaptor of claim 5, wherein said gripping members form a pair of outer gripping members and further including a pair of spaced apart inner gripping members between said pair of outer gripping members.

7. The adaptor of claim 5, wherein said attachment member further includes a post aperture through said base member and said clamp includes a post extending through said post aperture.

8. The adaptor of claim 6, wherein the inner pair of gripping members includes a plurality of ribs and the outer pair of gripping members includes a plurality of ribs and wherein the pitch of the ribs of the inner pair of gripping members is greater than the pitch of the ribs of the outer pair of gripping members.

9. The adaptor of claim 1, wherein said gripping members further include a plurality of ribs extending therefrom.

10. The adaptor of claim 9, wherein the ribs of said gripping members are provided at 11½ threads per inch.

11. The adaptor of claim 9, wherein the ribs of said gripping members are provided at 8 threads per inch.

12. The adaptor of claim 3, wherein said attachment member further includes a post aperture and said clamp includes a post extending through said post aperture.

13. An adaptor for attachment to a cable puller for securing the cable puller to a conduit, the adaptor comprising:

a mounting member for securement to the cable puller, said mounting member including spaced apart plates having apertures therein, a guide roller mounted between said plates and attached to the cable puller, and a pin positioned within said apertures for fixing the position of said attachment member relative to said cable puller;

an attachment member secured to said mounting member, said attachment member including a pair of spaced apart gripping members;

a clamp attached to said attachment member, the position of said clamp being moveable relative to said attachment member, said clamp being capable of being locked into place relative to said attachment member; and wherein in use an outer surface of the conduit is placed against said gripping members and said clamp is secured to said attachment member so as to secure said adaptor to the conduit.

14. An adaptor for attachment to a cable puller for securing the cable puller to a conduit, the adaptor comprising:

a mounting member including spaced apart plates for securement to the cable puller;

an attachment member secured to said mounting member, said attachment member including a base member having a post aperture therethrough, first and second flanges extending outwardly from said base member to form a V-shaped groove, a pair of spaced apart inner gripping members, and a pair of spaced apart outer gripping members;

a clamp including a post extending therefore, said post extending through said post aperture; and wherein in use, an outer surface of the conduit is placed against one of said pairs of gripping members and said clamp is secured to said attachment member so as to secure said adaptor to the conduit.

15. An adaptor for attachment to a cable puller for securing the cable puller to a conduit, the adaptor comprising:

a mounting member for securement to the cable puller, said mounting member being configured to allow a cable to pass from an interior of the conduit to the cable puller;

an attachment member secured to said mounting member, said attachment member including a pair of spaced apart gripping members;

a clamp attached to said attachment member, said clamp includes a first portion and a second portion and wherein said first portion is wider than said second portion, the position of said clamp being moveable relative to said attachment member, said clamp being capable of being locked into place relative to said attachment member; and wherein in use an outer surface of the conduit is placed against said gripping members and said clamp is secured to said attachment member so as to secure said adaptor to the conduit, said second portion contacting an inner surface of the conduit.

16. An adaptor for attachment to a cable puller for securing the cable puller to a conduit, the adaptor comprising:

a mounting member for securement to the cable puller, said mounting member being configured to allow a cable to pass from an interior of the conduit to the cable puller;

an attachment member secured to said mounting member, said attachment member includes a base member, first and second flanges extending outwardly from said base member to form a V-shaped groove, and a pair of spaced apart gripping members, one of said gripping members of said pair of gripping members is provided on said first flange and one of said gripping members of said pair of gripping members is provided on said second flange;

a clamp attached to said attachment member, the position of said clamp being moveable relative to said attachment member, said clamp being capable of being locked into place relative to said attachment member; and wherein in use an outer surface of the conduit is placed against said gripping members and said clamp is secured to said attachment member so as to secure said adaptor to the conduit.

17. The adaptor of claim 15, wherein said gripping members form a pair of outer gripping members and further including a pair of spaced apart inner gripping members between said pair of outer gripping members.

18. The adaptor of claim 15, wherein said attachment member further includes a post aperture through said base member and said clamp includes a post extending through said post aperture.

* * * * *